United States Patent [19]

Gibson et al.

[11] Patent Number: 4,627,418

[45] Date of Patent: Dec. 9, 1986

[54] APPARATUS FOR THE CARBOTHERMIC REDUCTION OF METAL OXIDES USING SOLAR ENERGY

[75] Inventors: James O. Gibson; Mark G. Gibson, both of Pacific Palisades, Calif.

[73] Assignee: Geruldine Gibson, Santa Monica, Calif. ; a part interest

[21] Appl. No.: 570,858

[22] Filed: Jan. 16, 1984

Related U.S. Application Data

[60] Division of Ser. No. 184,957, Sep. 8, 1980, Pat. No. 4,472,367, which is a continuation-in-part of Ser. No. 961,536, Nov. 17, 1978, abandoned.

[51] Int. Cl.[4] ................................................. F24J 3/02
[52] U.S. Cl. ..................................... 126/438; 126/451; 126/452; 75/89; 266/200
[58] Field of Search ............... 126/438, 437, 439, 440, 126/452, 451, 900, DIG. 1; 266/200, 207, 171, 100, 177; 75/89, 46; 48/DIG. 9; 60/641.8, 641.15

[56] References Cited

U.S. PATENT DOCUMENTS

| 277,884 | 5/1883 | Clark | 126/451 X |
|---|---|---|---|
| 277,885 | 5/1883 | Clark | 126/451 X |
| 683,089 | 9/1901 | Wideen | 126/451 X |
| 1,599,481 | 9/1926 | Marcuse | 126/440 |
| 2,291,534 | 7/1942 | Deppe | 126/451 X |
| 3,064,534 | 11/1962 | Tumavicus | 126/451 |
| 3,196,366 | 7/1965 | Simpson | 126/451 |
| 3,203,167 | 8/1965 | Green, Jr. | 126/438 X |
| 3,217,702 | 11/1965 | Miller | 126/451 |
| 3,869,199 | 3/1975 | Cummings | 126/440 |
| 3,927,659 | 12/1975 | Blake et al. | 126/438 |
| 3,993,458 | 11/1976 | Anitol, Jr. | 48/209 |
| 4,000,733 | 1/1977 | Pouly | 126/451 |
| 4,068,474 | 1/1978 | Dimitroff | 126/440 X |
| 4,090,498 | 5/1978 | Benson | 126/442 |
| 4,114,685 | 9/1978 | Schwartz | 126/440 |
| 4,121,564 | 10/1978 | Schwartz | 126/438 |
| 4,135,489 | 1/1979 | Jarvinen | 126/901 |
| 4,139,286 | 2/1979 | Hein et al. | 126/440 X |
| 4,164,123 | 8/1979 | Smith | 126/438 X |
| 4,202,321 | 5/1980 | Volna | 126/425 |
| 4,204,914 | 5/1980 | Diggs | 126/439 |
| 4,205,661 | 6/1980 | Chapman | 126/425 |
| 4,229,184 | 10/1980 | Gregg | 126/438 |
| 4,249,515 | 2/1981 | Page | 126/438 |
| 4,263,895 | 4/1981 | Colao | 126/438 |
| 4,286,581 | 9/1981 | Atkinson, Jr. | 126/437 |
| 4,290,779 | 9/1981 | Qader | 126/438 |
| 4,402,306 | 9/1983 | McElroy | 126/437 |

Primary Examiner—Larry Jones
Assistant Examiner—Carl D. Price
Attorney, Agent, or Firm—Max Geldin

[57] ABSTRACT

An apparatus and process are disclosed for utilizing solar radiation and the energy contained therein for the carbothermic reduction of a metal oxide to a metal carbide. The apparatus comprises a reflective surface which collects and focuses solar radiation onto a focal mirror which consequentially reflects and focuses the solar light rays into a reaction chamber through a Fresnel lens and a transparent window provided on the chamber. The solar light rays are focused by the reflective surface focal mirror and Fresnel lens such that the energy absorbed by reactants in the reaction chamber is sufficient for the carbothermic reduction of the metal oxide.

10 Claims, 10 Drawing Figures

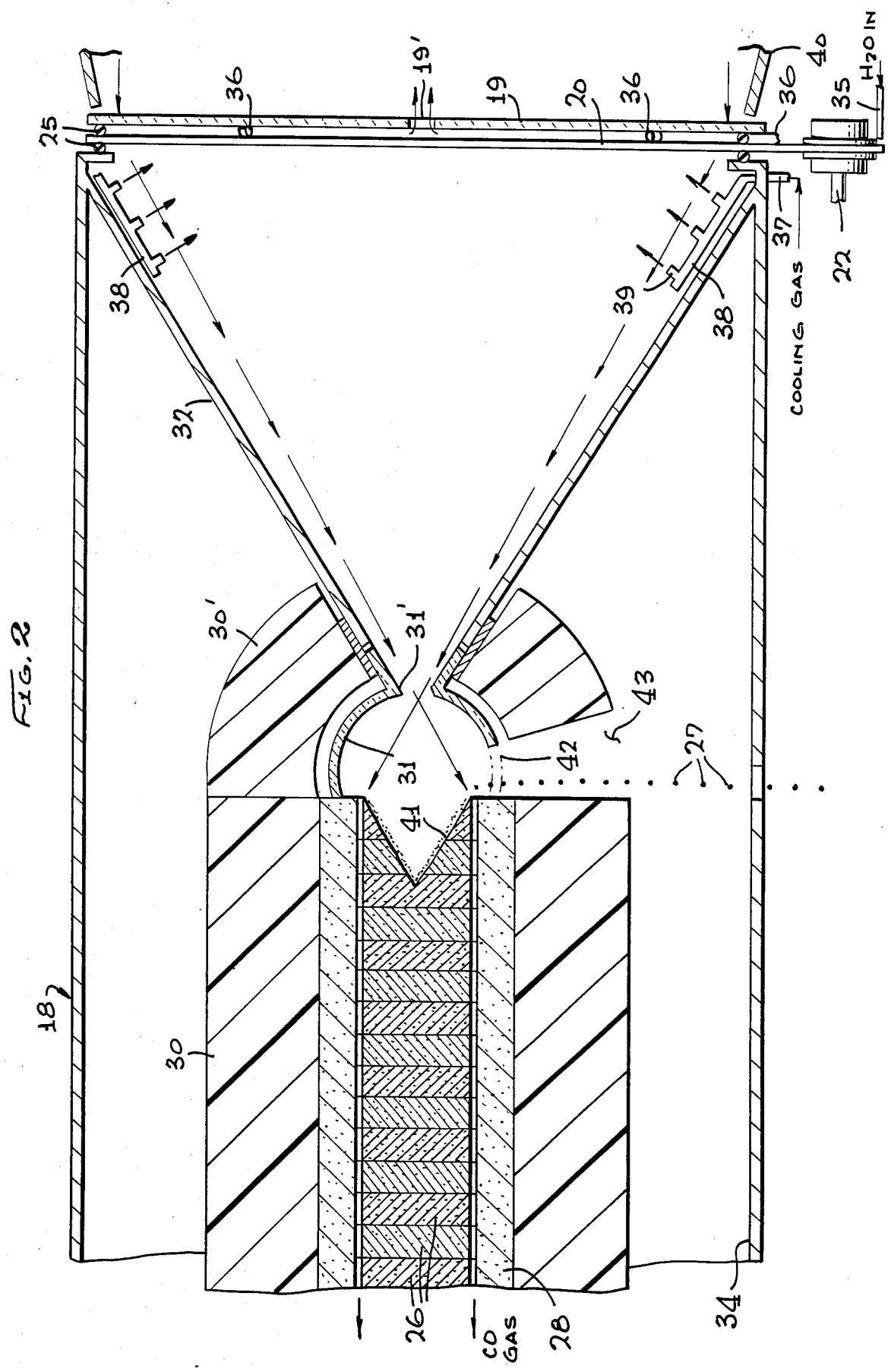

CONCENTRATED BEAM OF SOLAR PROTONS

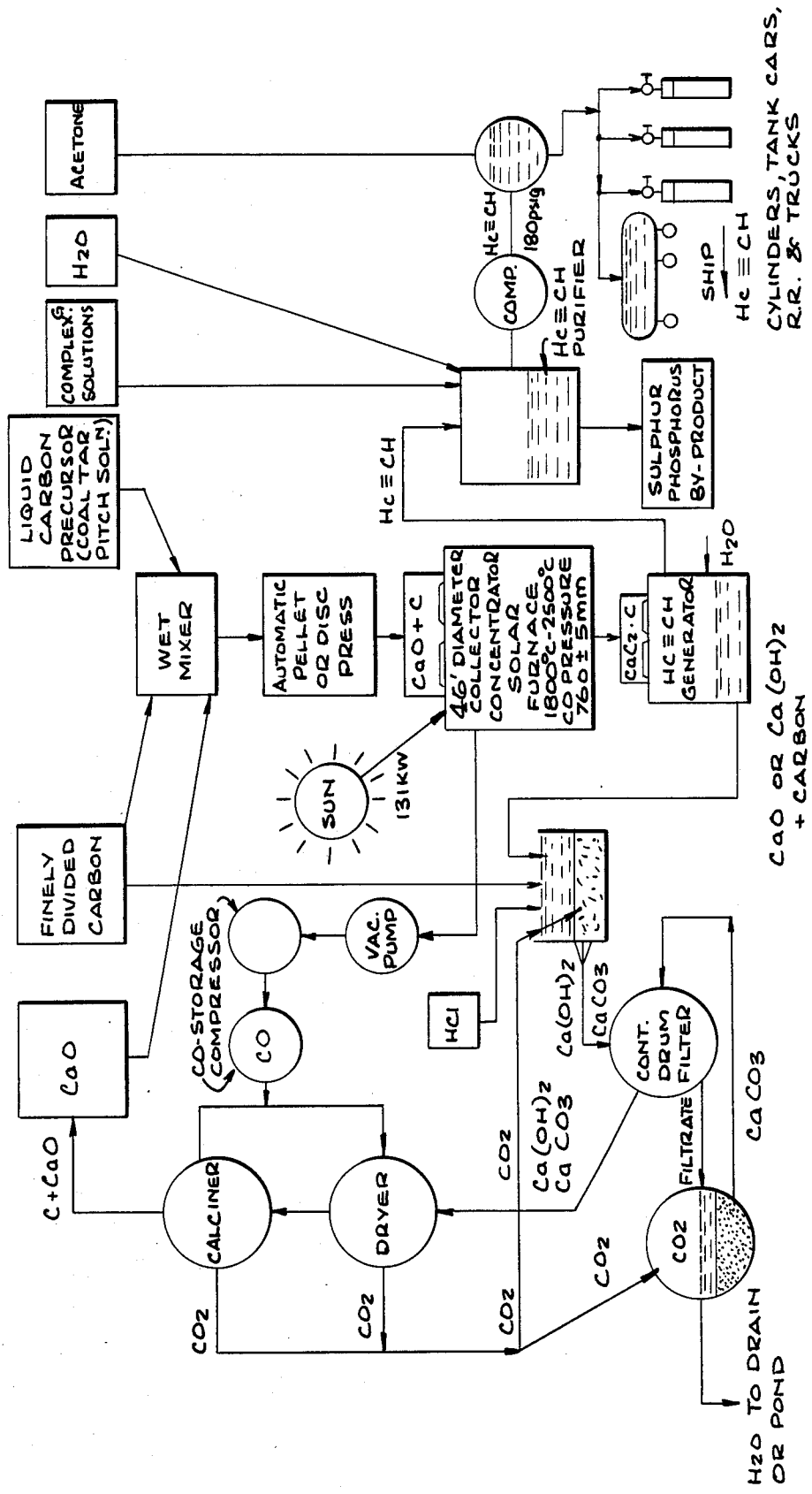

APPARATUS FOR THE CARBOTHERMIC REDUCTION OF METAL OXIDES USING SOLAR ENERGY

This is a division of application Ser. No. 184,957, filed Sept. 8, 1980, now U.S. Pat. No. 4,472,367, which is a continuation-in-part of application Ser. No. 961,536, filed Nov. 17, 1978, now abandoned.

BACKGROUND OF THE INVENTION

This invention relates to a method and apparatus for capturing solar energy and utilizing such solar energy to initiate and sustain endothermic chemical reactions. Such chemical reactions can transduce the solar energy into chemical energy and thereby store the energy until it is required such as by producing a chemical fuel. The method and apparatus also relate to converting solar energy into an easily handleable and storable form of energy which can be recovered when needed rather than utilized only when the sun is shining. Primarily, the method and apparatus concern the carbothermic reduction of metal oxides using solar energy to form a metal carbide which metal carbide can subsequently be processed into fuel or other useful chemical products.

In the process of converting energy into mechanical and electrical power, many forms of energy converters have been utilized. The most widely used converters are gasoline and diesel engines, jet engines, steam turbine engines and gas turbine engines. All of these engines make use of the conversion of a fossil fuel into kinetic energy which is then converted directly to mechanical power. These energy converters are dependent upon fossil fuels or refined fossil fuels, which fossil fuels are becoming ever increasingly less available and more costly. Such fossil fuels also require tremendous capital investment for recovery, refining and distribution.

Tremendous amounts of solar energy, however, are striking the earth's surface every day. Solar insolation has been measured to be about 1 kw/m$^2$ (or about 0.1 w/cm$^2$), Eldon C. Boes, et al., "Distribution of Direct and Total Solar Radiation Availabilities for the U.S.A.," Sandia Laboratories Report, SAND 76-0411. Such insolation can provide 20,720 megawatt hours of energy for an eight-hour day on a square mile of the earth's surface. The majority of such solar energy is not being converted to useful energy forms for man's use. Some methods have been developed which make use of the incident solar energy striking the earth's surface. Conventional methods for the utilization of solar energy include methods for the auxiliary heating of dwellings, office buildings and water. Other methods of using solar energy relate to direct use of solar energy for heating steam boilers to provide steam to turn turbines to perform work or to generate electrical energy.

All earthbound solar energy converters are limited generally to a period of up to about 10 to 12 hours of effective operation a day. Such a period is created due to the limited availability of useful sunlight. Therefore, such solar energy converters, which utilize solar energy to provide steam, are operable only periodically and generally must be shut down during periods when the sun is not shining or a secondary means of generating steam during such periods must be provided.

U.S. Pat. No. 277,884 to Clark is directed to reducing refractory metallic ores such as the oxides and chlorides of aluminum, magnesium, calcium and platinum, by exposing such oxides with a reagent such as carbon, to the concentrated rays of the sun. The product of the reduction reaction is the corresponding metal. There is no teaching or suggestion in Clark of carrying out a carbothermic reduction of a metal oxide using solar energy under conditions to produce metal carbides.

U.S. Pat. No. 4,147,534 to Hori discloses the production of calcium and magnesium metal via carbothermic reduction of their oxides and rapid thermal quenching. This is a gas phase equilibrium process for the production of Ca and Mg metal.

U.S. Pat. No. 2,829,961 to Miller discloses a process for producing aluminum metal by reacting $Al_4O_4C$ with $Al_4C_3$. Miller does not initiate or maintain the endothermic reaction with solar heat, nor does the patent teach the production of aluminum carbides.

British Pat. No. 951,416 discloses the production of metal carbides by reaction of metal oxides with, for example, carbon in a molten menstruum of metallic sodium or potassium.

U.S. Pat. No. 4,049,425 to Middelhoek, et al discloses a process for producing aluminum alloys via carbothermic reduction in the presence of iron, cobalt or nickel at a temperature between 1,000° C. and 1950° C. at subatmospheric pressure.

U.S. Pat. No. 3,101,308 discloses the use of the hierarc principle to transfer energy to a reacting mixture such as, for example, an oxide ore and carbon in order to produce either the metal or a metal carbide. This patent does not disclose use of solar energy to bring about the carbothermic reduction of a metal oxide.

SUMMARY OF THE INVENTION

This invention is directed to a method and apparatus for conducting endothermic chemical reactions. Primarily, it is directed to the carbothermic reduction of metal oxides using solar energy. The method comprises collecting solar radiation and focusing the solar radiation into a reaction chamber containing a metal oxide and carbon for initiating and sustaining the carbothermic reduction of the metal oxide to form a metal carbide. The focusing of the solar radiation concentrates the solar energy within such radiation to a degree sufficient to initiate and sustain a reaction between the metal oxide and carbon, to produce a liquid phase metal carbide.

For the carbothermic reduction of a metal oxide, the solar energy is concentrated sufficiently for heating the reactants to a temperature greater than about 1800° C. The solar radiation flux generally required to obtain such a temperature is from about 560 to about 840 watts per square centimeter (w/cm$^2$). Such energy level is sufficient to initiate and sustain the carbothermic reduction to carbides of various metal oxides such as oxides of metals selected from the group consisting of lithium, sodium, potassium, rubidium, cesium, magnesium, strontium, calcium, barium, aluminum, scandium, yttrium, uranium, thorium, cerium, praseodymium neodymium, promethium, samarium, europium, gadolinium, terbium, dysprosium, holmium, erbium, thulium, ytterbium, lutetium, protractinium, neptunium, plutonium, americium, curium and berkelium, or mixtures thereof.

The preferred oxides are the oxides of calcium and aluminum, oxides of the rare earth or lanthanum group, particularly the oxides of neodymium and praseodymium, and mixtures thereof known as didymium. Mixtures of $Nd_2O_3$ and $Pr_2O_3$ have excellent absorption of the solar photon spectrum. Mixtures of $CaO/Nd_2O_3/Pr_2O_3$ and $Al_2O_3/Nd_2O_3/Pr_2O_3$ can also be employed.

The metal oxide and carbon are intimately mixed to form a homogeneous mixture. The homogeneous mixture is then exposed to the concentrated solar radiation for reducing the metal oxide to a metal carbide. The metal carbide provides a simple means of storing the solar energy in the metal carbide which can at a later time be reacted to form hydrogen, acetylene, methane or other hydrocarbon material which can be utilized as a fuel.

The apparatus for conducting this method for the carbothermic reduction of metal oxides using solar energy comprises a primary reflective surface having an optical axis and a focal distance along such optical axis, for collecting, reflecting and focusing the solar insolation striking such reflective surface. A focal mirror having its reflective surface facing the primary reflective surface is positioned in spaced relation to said reflective surface along the optical axis and within the focal pathway of light reflected from said reflective surface. A reaction chamber is positioned in spaced relation to the reflective surface and the focal mirror along the focal pathway of light or solar radiation reflected from said focal mirror such that light reflected from the focal mirror passes into the reaction chamber. Preferably, a Fresnel lens is positioned in front of the reaction chamber along such focal pathway of light so that light reflected from the focal mirror first passes through the Fresnel lens where further focusing and concentration of the solar radiation occurs. The light rays then enter the reaction chamber. A target area is positioned within the reaction chamber in the path of the reflected light. The reaction chamber is provided with means for feeding metal oxide and carbon into the reaction chamber and target area.

In the arangement of the apparatus, the focal mirror is positioned between the sun and the reflective surface on the reflective side of the reflective surface. The reflective surface is directed toward the sun such that the rays of sunlight striking the reflective surface are substantially parallel with its optical axis. Solar light rays striking the reflective surface are collected and focused onto the focal mirror. The focal mirror reflects and focuses such incident solar rays toward a focal point behind the reflective surface. The reflective surface has an opening centrally located through which such reflected light can pass. The reaction chamber is positioned behind the reflective surface directly in line with the reflected light rays and axially aligned with the focal mirror, the Fresnel lens and the opening in the reflective surface. The reaction chamber has a light transmitting window on an end directed toward the opening in the reflective surface and the focal mirror. The light transmitting window permits the concentrated and reflected light to enter the reaction chamber. Such a window can be made from material selected from the group consisting of quartz, Pyrex, sapphire and Vycor (trademarked brand of glass made by Corning Glass Works). The light transmitting window can be equipped with means for cooling the window. The window can be cooled to prevent harmful effects due to the high energy level of the concentrated rays of light being transmitted through the window. As the window revolves, a different area is presented to the high energy light rays thereby dissipating the energy absorbed by the window. The revolving of the window can also allow continual cleaning of the window to prevent fogging and buildup of material thereon.

Within the reaction chamber the metal oxide and carbon are intimately mixed into a homogeneous solid mixture. The mixture can be formed into discs having slots at their periphery to allow the hot carbon monoxide gas generated during carbothermic reaction to flow countercurrent to the disc feed direction and thereby preheat said discs. The metal oxide and carbon mixture is fed to a target area within the reaction chamber. The concentrated light rays transmitted into the reaction chamber impinge upon the mixture of reactants at the target area releasing heat for initiating and sustaining the carbothermic reduction of the metal oxide.

The reaction chamber can also be equipped with a parabolic cone reflector positioned between the window and the target area and encircling the path of the concentrated light rays from the focal mirror. Such a parabolic cone reflector can reflect light striking its surface toward the target area.

BRIEF DESCRIPTION OF THE DRAWINGS

The features and advantages of the invention will become more fully understood from the following detailed description of certain preferred embodiments, taken in connection with the accompanying drawings, in which:

FIG. 2 is a cross-sectional view of the reactor section of FIG. 1 above showing details of the apparatus;

FIG. 5 is a flow diagram for an overall process for converting solar energy into a useful form of recoverable energy.

DETAILED DESCRIPTION OF THE INVENTION

Figure 1:
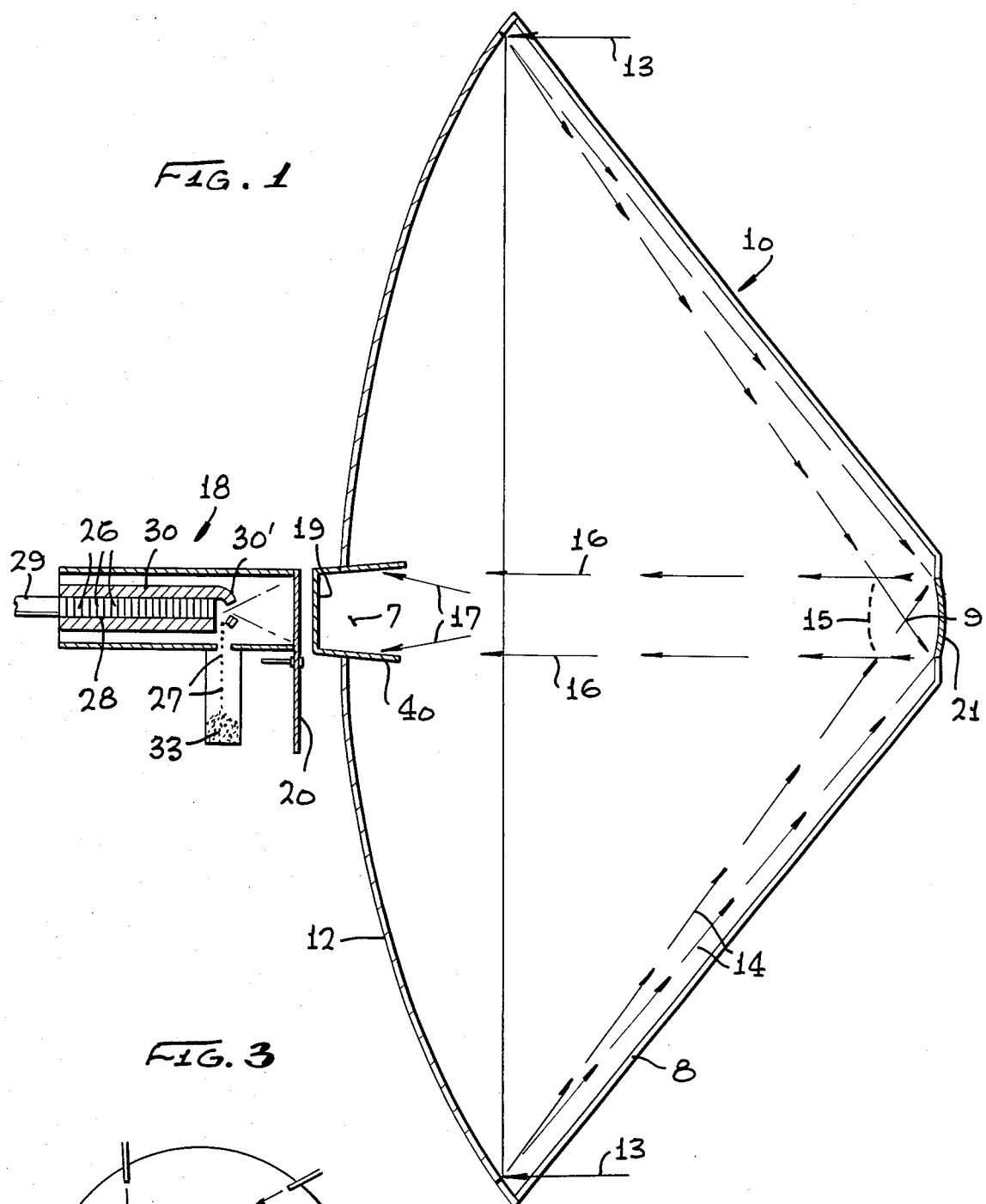
FIG. 1 is a simplified lateral view partially in section of apparatus of the present invention.

With reference to FIG. 1 there is disclosed a simplified lateral view partially in section of one embodiment of the apparatus of the present invention. The apparatus provides a means for converting solar energy into a more useful form of energy. Primarily, the apparatus utilizes solar energy to bring about an endothermic chemical reaction and, more specifically, to initiate and sustain the carbothermic reduction of a metal oxide. Throughout the detailed description of the embodiments of the present invention, like numerals will correspond to like elements in the figures.

The apparatus 10 comprises a first reflective surface 12, preferably of polished aluminum, having an optical axis and focal distance along such optical axis. The first reflective surface 12 can be of any configuration which allows collection, reflection and focusing of light rays incident to its surface. Preferably, the reflective surface is parabolic in shape. A parabolic reflective surface provides effective collection and focusing of light rays incident to its surface. Incident rays 13 which strike the reflective surface 12 are reflected in a converging path 14 upon a focal mirror 21. The reflective face of the focal mirror 21 is directed toward the reflective surface 12. The configuration of the focal mirror 21 is dependent upon its location in relation to the focal point of the reflective surface 12. In one embodiment of this invention, illustrated in FIG. 1, a focal mirror can be placed between the reflective surface 12 and the focal point 9 of the reflective surface 12. When a focal mirror is placed between the focal point and the reflective surface 12, the focal mirror generally indicated by dotted lines at 15 in FIG. 1, has a convex hyperboloid configuration. In a preferred embodiment, the focal mirror as at 21 is placed beyond the focal point of the reflective surface 12. Mirror 21 has a generally concave ellipsoid confiruration. The focal mirror 15 or 21 is positioned between the reflective surface 12 and the sun. The shading effect of the focal mirror on the reflective surface can be taken into consideration when designing and determining the size of the reflective surface 12. The focal mirror is sufficiently small in comparison to the reflective surface 12 and the reflective surface is sufficiently large that the shading of the reflective surface by the focal mirror is small or negligible.

As illustrated in FIG. 1, the focal mirror as shown at 21 can be supported by struts 8 attached to the reflective surface 12. The struts 8 serve to maintain the focal mirror 21 in proper alignment with the reflective surface 12 and the opening 7 in the reflective surface such that the light rays 16 reflected from the focal mirror pass through the opening 7. The struts 8 can be hollow tubes which can provide cooling fluid, such as water, to the focal mirror to keep the focal mirror cool and prevent heat buildup due to the concentrated solar radiation focused onto the focal mirror from the reflective surface 12. Thus, the light rays 14 striking the focal mirror 15 or 21 are reflected along the pathway 16 shown in the drawing. The focal mirror 15 or 21 focuses the light incident to its surface such that the reflected light travels in a generally parallel pathway 16, having a focal point at infinity, toward a Fresnel lens 19 positioned in front of a reaction chamber 18 and along its focal pathway of light. It is preferred in this embodiment of the invention that the Fresnel lens 19 be behind the reflective surface 12. To position the Fresnel lens behind the reflective surface, the reflective surface 12 is provided with an opening 7 which allows the reflected light to pass therethrough. The opening is generally slightly larger than the diameter of the focal mirror 21 because the reflected light rays 16 are parallel.

The opening 7 and the focal mirror are centrally and axially positioned relative to the reflective surface. The opening 7 is within the area of the reflective surface that is shaded by the focal mirror, therefore, little of the reflective property of the reflective surface is lost due to such opening.

Behind the reflective surface 12 and Fresnel lens 19, and positioned axially in line with the focal mirror 21 and opening 7 in the reflective surface is the reaction chamber 18. The reaction chamber wherein the carbothermic reduction of a metal oxide occurs has a transparent window 20 for transmitting reflected light rays into the chamber. The window 20 can be constructed from any transparent material. However, due to the concentrated solar rays striking and passing through the window, it is necessary that the window be able to withstand the high energy flux and elevated temperature generated thereby. Suitable materials for construction of the window 20 include Pyrex, quartz ($SiO_2$), sapphire ($Al_2O_3$) and Vicor, a trademark of a glass made by Corning Glass Works. The reaction chamber 18 can be provided with a water jacket 34 for cooling the reaction chamber.

Figure 3:
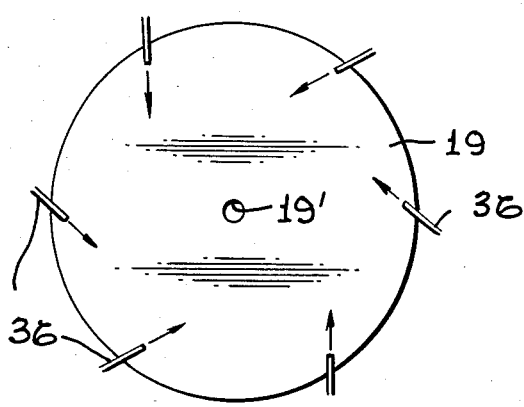
FIG. 3 is a side view of the Fresnel lens and the reaction chamber window, illustrating details of the cooling jets.

Referring to FIGS. 1 and 2, due to the large energy flux through the Fresnel lens 19 and the window 20, it is necessary to cool these transparent windows. In the preferred embodiment the window is revolved about an axis perpendicular to its surface for cooling. A motor (not shown), such as a conventional electric motor, can be used to revolve the window on a shaft 22. The window 20 effectively seals the end of the reaction chamber 18 by placing "O" rings 25, e.g. formed of boron nitride, between the window and reaction chamber and between the window and the Fresnel lens. As the window revolves, a new area of the window is exposed to the concentrated light rays 16. The area of the window previously exposed to the light rays can be cooled by cooling means such as by coolant fluid flow directed toward the outer surface of the window 20. It is preferred to direct the cooling fluid, such as water, onto the outer surface of window 20, by water jets 35, to prevent any coolant remaining on the window from entering the reaction chamber. Further cooling of window 20 can be accomplished by passing compressed CO cooling gas through pipe 37 into a manifold 38 within the reaction chamber 18 and discharging the CO gas from distributors 39 against the inside surface of the window 20. Referring also to FIG. 3, the Fresnel lens 19 in FIG. 2 can be cooled by blowing compressed air between the window 20 and the Fresnel lens 19 with appropriate air jets 36 which pass through the O-ring seal 25 between window 20 and lens 19. The cooling air exits through a small central aperture 19' in the Fresnel lens.

The inner surface of the window 20, i.e., the surface facing inward, can have a film or deposit formed thereon due to the reaction occurring within the reaction chamber. For example, a deposit of carbon can form on the window. Such a film or deposit can interfere with the transmission of light through the window and thereby decrease the amount of light energy transmitted into the reaction chamber. Further, such a film or deposit can also cause additional heating of the window due to the increased absorption of light energy. By revolving the window 20, the inner surface of the window can be periodically or continuously cleaned by cleaning means (not shown) for removing films or deposits formed thereon. Such cleaning means can be a brush, a knife blade, squeegee and the like and can be positioned to clean any film or deposit from the window as the window revolves.

Referring again to FIGS. 1 and 2, the light rays 16 reflected from the focal mirror 21 pass through the Fresnel lens 19 and the window 20 and continue into the reaction chamber 18. A target area 26 is positioned in the light pathway such that the energy striking the target area is sufficient to initiate and sustain the carbothermic reduction of a metal oxide. In the preferred embodiment, at least one additional reflective surface is positioned between the target area 26 and the focal mirror 21. Such reflective surfaces can be parabolic or conical. A cone reflector 40 which can be formed of electropolished aluminum can be employed. Such additional reflective surfaces are provided for directing slightly off axis reflected light rays 17 from the focal mirror 21, which are not in focus with the majority of the light rays 16 reflected from the focal mirror 21, in the direction of the target area 26, and increase the efficiency of the apparatus.

Generally, the amount of energy required to initiate and sustain the carbothermic reduction is an energy sufficient to maintain a temperature of at least about 1800° C. at the target area. Preferably, an energy producing temperature of from about 1800° to about 2500° C. is suitable for initiating and sustaining the carbothermic reduction reaction. While the carbothermic reduction of some metal oxides can occur at temperatures less than 1800° C., such reaction occurs at a relatively slow rate. The carbothermic reduction reaction occurs at a faster rate as the temperature increases and, for this reason, a temperature of at least about 1800° C. is preferred and even more preferred is a temperature range of from 1800° to about 2500° C. Generally, the amount of energy required to generate these preferred temperatures at the target area is an energy density from about 560 to about 840 watts/cm$^2$. For example, the carbothermic reduction of calcium oxide (CaO) with carbon to form calcium carbide (CaC$_2$) requires about 1500 to about 3000 watts per pound of CaC$_2$ formed, R. Norris Shreve, The Chemical Process Industries, 1st Ed., p. 325 (1945). The actual energy required for the carbothermic reduction reaction depends upon the metal oxide to be reduced, but generally is at least about 560 watts/cm$^2$.

Figure 3A:
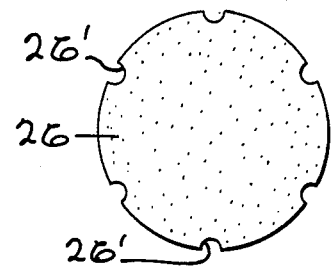
FIG. 3a is a side view of a reactant disc employed in the apparatus of FIG. 2.

The solid reactants can be in any form such as solid rods, discs, pellets and powders. Regardless of the form of the reactants, the resulting solid reactants are intimately mixed to form a homogeneous mixture of the metal oxide and carbon. Means in the form of a graphite tube 28 for feeding the metal oxide and carbon mixture to the target area is provided in the reaction chamber 18. For example, with reference to FIG. 1, a push rod mechanism 29 is shown for delivering the solid reactant mixture into the target area. When the reactants are in the form of pellets or powder, they can be fed to the target area by feeding means such as a screw feed mechanism. In the preferred embodiment and practice of the invention, the reactants are homogeneously mixed and formed into discs, as at 26. As seen in FIG. 3a, discs 26 have spaced slots 26' on their outer periphery for passage of CO gas therethrough, as noted hereinafter. The discs are arranged or stacked in contact with each other, e.g. one on top of another, one disc engaging the disc below. In normal operation the axis of chamber 18 will be 30° to 60° above the horizontal. As seen in FIG. 2, insulation 30, such as Grafelt insulation comprised of about 98% carbon is provided around the graphite tube 28.

As the reactants in each disc are heated by the photon flux, the carbothermic reduction reaction results in a liquid metal carbide product being formed, as described in greater detail hereinafter. As the liquid metal carbide 27 is formed, it flows off the target area in droplets, and down the reaction chamber for collection in a collection chamber 33. Hot carbon monoxide generated in the reaction, as well as any CO used for cooling the inside surface of the transparent window 20, passes through the slots 26' of reaction discs 26 countercurrent to disc feed direction and preheats the discs.

Energy greater than the amount required to react the metal oxide and carbon can be utilized to change the reactants from the solid phase to a liquid phase. This change of the metal carbide product to liquid phase automatically serves to continuously remove completely reacted material, thus exposing the partially reacted surface to an energy flux sufficient to complete the endothermic reaction at which point the carbide produced will become liquid and flow. The automatic transfer of liquid carbide from the reaction zone to a collection chamber is another feature of the process. As the reaction proceeds and consumes the reactant discs 26, a conical cavity 41 is formed in the discs subjected to heating by the photon flux, at the reaction front.

Also, within the reaction chamber 18 in front of the target area 26 is a refractory reflective hemisphere 31 insulated by Grafelt insulation cover 30', and having a throat 31' for passage of light rays transmitted through the Fresnel lens 19 and the reaction chamber window 20, into the target area 26. The reflective hemisphere 31 and insulation cover 30' have apertures 42 and 43, respectively, therein, to permit passage of liquid metal carbide 27 therethrough. Such reflective hemisphere has a cone reflector section 32 connected to throat 31' and which diverges in the direction of the window 20 of the reaction chamber for diverting solar radiation in a converging pathway to the throat 31' of the refractory hemisphere 31. The reflective hemisphere 31 and integrally connected cone reflector section 32 can be formed of a reflective refractory material, e.g. polished titanium carbide.

Means for directing the reflective surface 12 toward the sun and tracking the sun are provided on the apparatus to enable the apparatus to be used for the available period of time while the sun is viewable. Conventional two-axis solar tracking equipment (azimuthal and elevational) is suitable for such directing means.

It is preferred to locate the apparatus in a region on the earth's surface where there is reasonable availability of sunlight. The apparatus can be located in rather remote areas, such as deserts, as only a small amount of conventional power is required by the apparatus in the overall process for the production of the metal carbide. The primary natural resources needed for the overall reaction are an abundance of sunlight, a metal oxide, water and carbon. As illustrated in FIG. 5, the process can provide for the recycle of the metal and thereby decrease the dependency of the system on a continuous source for the metal.

Figure 4:
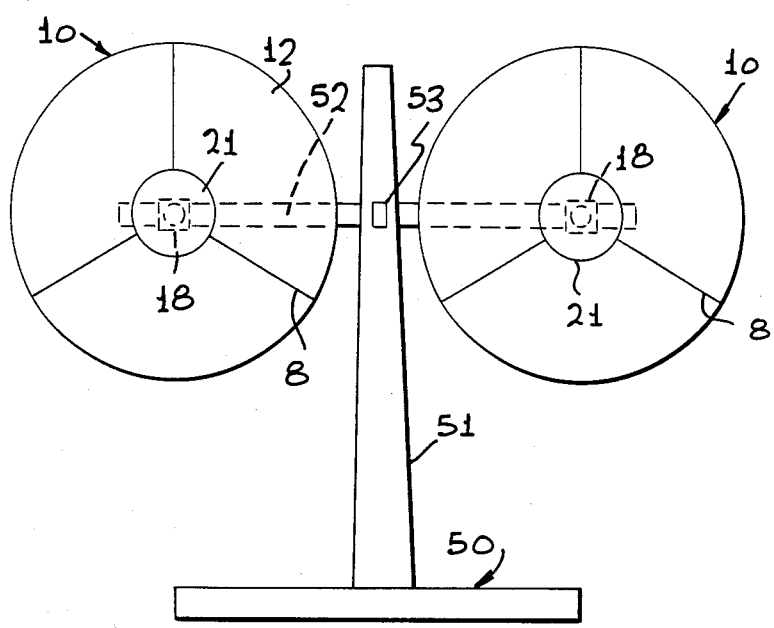
FIG. 4 illustrates a support and tandem arrangement of apparatus of the invention.

With reference to FIG. 4, there is schematically illustrated an arrangement for the support of the apparatus of this invention. A support 50 has an upwardly extending arm 51. The upwardly extending arm 51 supports and has pivotally attached thereto a horizontally extending arm 52. The upwardly extending arm 51 has means 53 for two-axis tracking of the sun. Such tracking means 53 controls the rotation of arm 51 and the pivoting of arm 52 to maintain the apparatus 10 directed toward the sun. The upwardly extending arm 51 can rotate about a vertically extending axis. Such rotation of the arm 51 provides azimuthal tracking of the sun as it travels from horizon to horizon. The pivoting of arm 52 allows for elevational tracking of the sun as the elevation of the sun above the horizon changes. On each end of the arm 52 is attached the apparatus 10. By rotating the arm 52 downward, the reflective surfaces 12 can be protected from inclement weather such as sandstorms, high winds and the like.

Although each apparatus 10 can be supported by a separate support, it is preferred to support two apparatus 10 by one support such as illustrated by the tandem arrangement in FIG. 4. Two such apparatus provide a balancing effect on the support arm 52. Such a tandem arrangement also facilitates rotating the reflective surfaces 12 downward during inclement weather conditions. Also, by providing a tandem arrangement, one two-axis solar tracking means 53 can be utilized to direct and maintain the two reflective surfaces 12 toward the sun.

The sizes of the various elements of the apparatus are not critical as long as the required energy to initiate and sustain the carbothermic reduction reaction of the metal oxide is developed at the target area. An apparatus which has a reflective surface 12 of about 46 feet in diameter and a focal distance of about 23 feet, will be described herein to illustrate possible relative sizes of the various elements of the apparatus. With reference again to FIGS. 1 and 2, the reflective surface 12 can be a parabolic reflective surface about 46 feet in diameter, with a focal length of about 23 feet. A concave ellipsoid focal mirror 21, having a diameter of about 3.3 feet and a focal distance at infinity is suspended about 1.5 feet behind the focal point, or about 25 feet in front of the reflective surface 12. Light rays reflected from the focal mirror are directed toward an opening 7 of about 3.3 feet in diameter in the center of the reflective surface 12. A cone reflector 40 receives a small portion of the light which is slightly divergent from the 1-meter in diameter beam of light reflected from the focal mirror 21. This divergent light together with parallel rays of light fall on the Fresnel lens 19 which has a focal distance of about 800 cm.

A reaction chamber 18 axially aligned with the opening and focal mirror is attached to the reflective surface 12. A target area of about 314 cm$^2$ is located within the reaction chamber about one meter behind the reflective surface 12. The light transmitting window 20 has an effective window diameter relative to the chamber of about 1.0 meter and an overall diameter of about 2.2 meters to provide for such an effective window size. Any shadow cast on the reflective surface 12 caused by the shading effect of focal mirror 21 is about 1 meter in diameter. Such a shadow provides minimal loss of effective solar collecting area for the reflective surface 12.

The incident rays striking the 46 feet in diameter parabolic reflective surface 12 comprise about 153,940 watts of energy. These light rays are reflected to the focal mirror 21 which, with about a five percent loss of energy, receives about 145,460 watts incident radiation or, with an area of about 7854 cm$^2$, receives a flux of about 18.5 watts/hr-cm$^2$. This light is reflected toward a Fresnel lens 19 with a five percent loss in energy. The Fresnel lens 19 has an effective cross-sectional area of 7854 cm$^2$ and the incident radiation of 138,220 watts/hour provides a flux of 17.6 watts/hour-cm$^2$. The photons pass through the Fresnel lens 19 and the Pyrex window 20 with an additional 5% energy loss, reducing the photon energy level to 131,309 watts/hour. This converging beam of photons (focal point 800 cm from the Fresnel lens) is directed to a 30°-½ angle cone reflector/refractory-reflective hemisphere 31, 32. As in the case of cone reflector 40, cone 32 will reflect photon rays toward the target 26 which are slightly out of focus and would otherwise not pass through the throat 31' of the refractory reflective hemisphere/reflector 31. The cross-sectional area of this throat is 20.27 cm$^2$ (diam.=5.08 cm) and accordingly the photon flux through this throat is 6479 watts/hour-cm$^2$. The photons are on a diverging beam angle (60°) after passing the throat of the reflective cone which is also the focal point of the Fresnel lens. The targets or reaction discs 26 which have a diameter of about 15 cm. are indexed into the position where the diverging photon beam will have a diameter of 15 cm. This positon is about 16 cm. past the focal point.

A process for the carbothermic reduction of a metal oxide using the above described apparatus is practiced by first preparing the reactant material to be reduced. Such reactant material to be reduced comprises a homogeneous mixture of carbon and a reducible metal oxide. The metal oxide can be any suitable metal oxide which is capable of carbothermic reduction. Such metal oxide can be any of those previously noted such as calcium oxide or aluminum oxide.

The carbon in the homogeneous mixture is present in a stoichiometric excess over the amount required to produce the metal carbide. Such excess carbon can be in a particular range of molar ratios to the metal oxide depending upon the valence or valences of such selected metal in the metal oxide, in order to provide a reaction, in conjunction with sufficiently high temperature wherein the metal carbide is in the liquid phase, particularly as discussed hereafter. The excess carbon increases the light absorptivity of the mixture, i.e., the essentially black carbon allows for about 98 percent absorption of light for the entire solar spectrum. Therefore, for example, a target material to be reduced, can comprise a mixture of calcium oxide and carbon in a molar ratio of from about 1 to 3.1 to about 1 to 4 respectively, in order to absorb solar photons. For aluminum oxide, the target mixture can comprise aluminum oxide and carbon in a molar ratio of from about 2 to 9.1 to about 2 to 10, respectively. For the rare earths the ratio of metal oxide such as neodymium and praseodymium, to carbon can range from about 1 to 6.1 to about 1 to 7.

Preferably, the reactants are substantially pure and the reactant mixture made therefrom is substantially free of materials other than the metal oxide and carbon. By using substantially pure feed material, the possibility of competing chemical reactions other than the carbothermic reaction is limited.

Following the preparation of the homogeneous mixture of the reactants, the mixture is loaded into the reaction chamber in such a manner that the mixture can be fed to the target area for the concentrated solar light rays. The reflective surface 12 is directed toward the sun to collect solar insolation. The two-axis solar tracking means is engaged for maintaining the optical axis of the reflective surface substantially parallel to the sun's rays. Solar rays collected by the reflective surface are reflected in a converging pathway toward the focal mirror 21. The focal mirror reflects the solar rays incident to its surface as parallel rays (focal point at infinity) toward the Fresnel lens 19. The energy within this beam of photons is concentrated by the focal lens to a spot having a diameter of only 15 cm or an area of 177 cm$^2$. This is a concentration ratio of 1:8697.

The reflected light rays pass into the reaction chamber through the transparent window 20. The concentrated light rays strike and are absorbed by the homogeneous reaction mixture at the target area thereby providing energy to the mixture and bringing about the carbothermic reduction of the metal oxide to form metal carbide and carbon monoxide. The reaction chamber is maintained at a carbon monoxide pressure of 760 millimeters±5 millimeters. The preferred pressure is 765 mm. Since a by-product of the carbothermic reduction reaction of a metal oxide is carbon monoxide, the cover gas of carbon monoxide (CO) is continuously generated and operating at the preferred pressure of about 765 mm. The CO gas is continuously expelled from the reaction chamber and is collected for further processing.

Due to the presence of the large excess of carbon noted above, and the above noted high reaction temperatures (about 1800° to about 2500° C.), the carbothermic reduction reaction takes place in the liquid phase. By virtue of the carbon-rich composition and high temperatures, solar photon energy is absorbed in the liquid phase. Thus, as the carbothermic reduction occurs, the liquid metal carbide formed drips from the target area in the reaction chamber.

Referring now to FIGS. 6 to 9 of the drawing, there is illustrated the photon absorption, heat transfer mechanisms and production of the preferred $CaC_{2(l)} \cdot C_{(s)}$ composition, that is, calcium carbide in liquid phase containing an equimolar amount of carbon.

Figure 6:
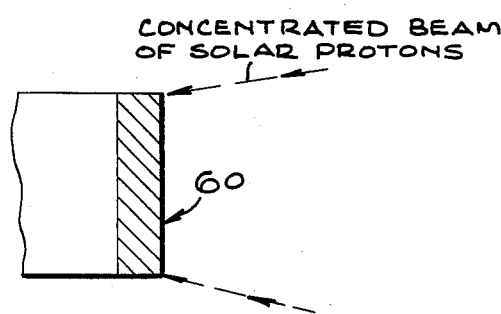
FIGS. 6 to 9 illustrate the course of the solar carbothermic reduction reaction in forming liquid phase metal carbide and carbon.

Referring to FIG. 6, there is illustrated a compressed disc 60 formed of a homogeneous mechanical mixture of calcium oxide and carbon in the molar ratio of 1 to 4. A concentrated beam of solar photons is focused on one side of the disc at a flux of 560 to 840 watts per $cm^2$. At an elapsed time of five seconds it is estimated that a solid state reaction has taken place to a depth of about 0.3 inch on a nominal 1-inch diameter disc producing $CaC_{2(s)} \cdot C_{(s)} + CO$ gas. At 15 second elapsed time, viewing FIG. 7, a liquid phase approximately 0.15 inch thick, as indicated at 62, developed at 560 watts/$cm^2$ at a temperature of about 1800° C., and commencing to form a cavity 64 in the face of the disc. At a temperature of about 2500° C. and at 850 watts/$cm^2$, the liquid calcium carbide also contains undissolved or solid state carbon in approximately the ratio of $CaC_{2(l)} \cdot C_{(s)}$. Pure $CaC_2$ is reported in the literature to be white to translucent. Commercial grade $CaC_2$ is whitish-grey. Accordingly, one would not expect $CaC_{2(s)}$ or $CaC_{2(l)}$ to be a good absorber of photons found in the solar spectrum. However, the preferred composition of 4 moles of C to one mole of CaO provides one mole of $C_{(s)}$ to each mole of $CaC_{2(l)}$ for the express purpose of absorbing solar photons. Since the $CaC_{2(l)}$ is reasonably transparent to solar photons, the photons apparently penetrate the liquid $CaC_{2(l)}$ to a considerable depth before being absorbed by carbon in the solid state, $C_{(s)}$. The recognition of this photon absorption phenomenon in the presence of calcium carbide in the liquid state is a feature of the invention.

Figure 8:
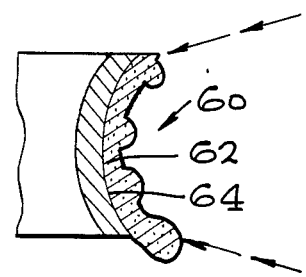
Figure 7:
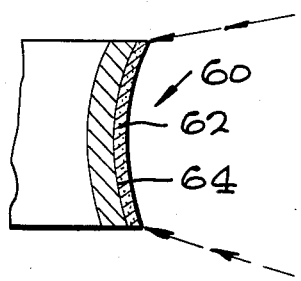
Figure 9:
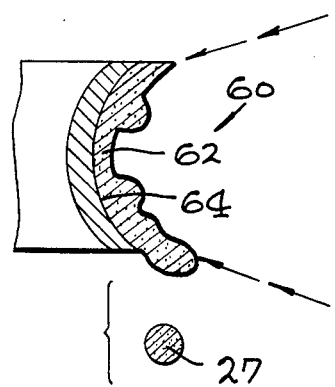

At an elapsed time of 40 seconds, referring to FIG. 8 of the drawing, the liquid layer has reached a maximum thickness of liquid which can remain supported by surface tension forces of the liquid on the solid state product substrate. At an elapsed time of 60 seconds, referring to FIG. 9, a drop of $CaC_{2(l)} \cdot C_{(s)}$ liquid 27 leaves the front face of the disc 60 as a sphere. As this material leaves, more heat is transferred through the solid state product to the CaO+4C reactants, whereupon it is converted into solid state product, $CaC_{2(s)} \cdot C_{(s)} + CO_{(g)}$ gas. Thus, there is a continuous solar photon absorption process where solar photon energy is absorbed in the liquid $CaC_{2(l)} \cdot C_{(s)}$ phase. In view of the highly efficient and novel photon absorption and heat transfer mechanism, and the continuous formation of the liquid carbide on a very low cross sectional area, which minimizes radiative, convective and conductive heat losses, a commercially efficient process is provided.

The apparatus and method provide for the batch operation and production of a metal carbide. Batch operation can be achieved such that the carbothermic reduction occurs during the time period the sun is available to provide the necessary energy. The proper amount of reactant mixture that enables total utilization of the available solar energy can be loaded into the reaction chamber at a time when the sun is not available or the solar rays are insufficient to initiate the reaction.

The rate of feeding the homogeneous mixture to the target area can be controlled to coincide with the speed of the reaction occurring at the target area. For example, if the sun is obscured by thin clouds, the feeding means can operate at a slower speed than on a clear day or when the sun is not obscured.

When the sun has set or when the energy level of the solar rays has become inadequate to initiate and sustain the carbothermic reduction, the metal carbide produced can be removed from the reaction chamber.

The metal carbide produced by this process and apparatus can be subsequently used to generate acetylene, methane, or other hydrocarbone products. For example, if the metal carbide is calcium carbide, water can be added to the calcium carbide to form acetylene. The acetylene can be purified and subsequently used as a high energy fuel or can be used in chemical processes as a starting material or intermediate for producing other chemicals, e.g., ethane.

FIG. 5 illustrates a flow diagram of an overall process for utilizing solar energy in the carbothermic reduction of calcium oxide to calcium carbide and the subsequent production of acetylene and recovery and recycling of the calcium. In the flow diagram, one method for the recovery of calcium and the subsequent formation of calcium oxide from the recovered calcium is illustrated. The calcium recovered and formed into calcium oxide is recycled to the reaction chamber together with additional carbon, for reaction to form a new batch of calcium carbide.

The acetylene produced by this process can be used as a fuel. The recoverable energy value per pound for acetylene is comparable to that for propane, methane, gasoline and kerosene. The production of acetylene thereby provides a mechanism for storing the energy received from the sun by solar insolation, which energy can be recovered at a subsequent time.

The solar energy collection, storage and recovery characteristics of this method can be represented by looking at the heat of formation of the product made by this method. The carbothermic reduction reactions can be represented by the following equations, wherein the metal carbide is in the liquid phase:

$$\text{Metal Oxide} + \text{Carbon} \xrightarrow{\text{Solar Energy}} \text{Metal Carbide} + \text{Carbon Monoxide} + \Delta H \quad (1)$$

The above reaction is endothermic as indicated by the positive $\Delta H$ and, therefore, requires an energy input which energy is supplied by solar energy. Exemplary are the reactions of calcium oxide and aluminum oxide below:

$$CaO + 4C \xrightarrow{\text{Solar Energy}} CaC_{2(l)} \cdot C_{(s)} + CO + 110.5 \text{ kcal/mole} \quad (2)$$

$$2Al_2O_3 + 10C \xrightarrow{\text{Solar Energy}} \quad (3)$$

-continued $$Al_4C_{3(l)} \cdot C_{(s)} + 6CO + 608.9 \text{ kcal/mole}$$

Depending upon the amount of excess carbon present in the starting mixture of metal oxide and carbon, liquid metal carbide together with solid carbon, as represented by metal carbide$_{(l)}$.$xC_{(s)}$, drips or flows from the target area. Thus, the liquid phase carbothermic reductions by means of solar energy according to the invention, using excess carbon produces a liquid metal carbide product containing 0.1 to 1.0 mole carbon, per mole of liquid metal carbide, e.g. $CaC_{2(l)}.0.1C_{(s)}$ to $CaC_{2(l)}.C_{(s)}$, $Al_4C_{3(l)}.0.1C_{(s)}$ to $Al_4C_{3(l)}.C_{(s)}$, and $Di_2C_{3(l)}.0.1C_{(s)}$ to $Di_2C_{3(l)}.C_{(s)}$.

The solar energy absorbed by the reactants is stored in the reaction products and primarily in the metal carbide formed as is represented by the following general equation:

$$\text{Metal Carbide} + \text{Water} \rightarrow \text{Metal Oxide or Metal Hydroxide} + \text{Hydrocarbon} - \Delta H \quad (4)$$

The solar energy stored within the reaction products can be stored indefinitely and can be recovered upon demand by conducting one of the above reactions represented by equation (4) to produce a fuel such as acetylene or methane. These reactions are exothermic and have negative heat of formation and thereby occur without additional energy input. Again, with reference to a calcium oxide/calcium carbide system, the following reaction formulae are representative:

$$CaC_2.0.1C + H_2O \rightarrow CaO + 0.1C + HC \equiv CH - 30.0 \text{ kcal/mole} \quad (5)$$

$$CaC_2.C + H_2O \rightarrow CaO + C + HC \equiv CH - 30.0 \text{ kcal/mole} \quad (6)$$

$$Al_4C_3.C + 12H_2O \rightarrow 4Al(OH)_3 + C + 3CH_4 - 415.8 \text{ kcal/mole} \quad (7)$$

$$Di_2C_3.C + H_2O \rightarrow Di_2O_3 + C + HC \equiv CH + H_2 \quad (8)$$

The acetylene produced from calcium carbide can be combusted as a substitute fuel for contemporary fossil fuels and upon combustion provides 310.6 kcal/mole of energy. Similarly, other hydrocarbons or hydrogen can also be used as a fuel for their heating values.

By arranging a plurality of such apparatus within an area where the sun shines for long periods of time during the year, and the energy level of such solar insolation is relatively high, a large volume of acetylene can be produced. The acetylene produced from such a plurality of apparatus can be used as a substitute fuel due to its high heating value and clean burning characteristics or can be used as a chemical intermediate. Using metal oxides other than calcium oxide can provide the formation of metal carbides from which other hydrocarbons can be formed. For example, using aluminum carbide to generate methane. The methane can then be used as a fuel. The methane produced by this process has a higher heating value than natural gas and has cleaner burning characteristics. The flow sheet of FIG. 5 is also generally applicable to the carbothermic reduction of metal oxides other than calcium oxide, such as aluminum oxide for the production of aluminum carbide and methane.

As the energy requirement for the apparatus is primarily that of solar energy and since some of the reactants can be recycled, the method herein described presents an economical method for creating an alternative energy source to the conventionally used fossil fuels. The sun's energy is substantially consistent and is generally being little utilized. This method provides one method of capturing the energy of incident sunlight and of storing such energy indefinitely in a form from which the energy can be readily retrieved and put to use.

The apparatus herein described for conducting this method comprises a combination of related elements which by acting together provide an efficient apparatus for collecting solar energy and converting that energy into a more useful, handleable and storable form of energy. The apparatus is designed with the reaction chamber behind the reflective surface for ease of operation such as for loading reactants and recovery of product. Further, by positioning the reaction chamber behind the reflective surface and using a double reflection of the solar light there is no need to provide strong payload support elements to support a reaction chamber as would be required when only a single reflecting and focusing surface is used. Additionally, balancing of the apparatus is easier with the double reflective apparatus herein described than when a single reflective surface having a reaction chamber positioned thereabove is used. The addition of a second light concentrating element, that is a Fresnel lens, according to another feature of the invention, into the optical pathway of light from a double reflecting system permits the use of reaction furnace designs which can minimize conductive, convective and particularly radiant heat losses. This final concentration of light by the Fresnel lens permits all collected energy to be directed through a small aperture in a reaction chamber, blocking large heat losses and increasing thermochemical energy conversion.

While the present invention has been disclosed in connection with preferred embodiments thereof, it should be understood that there can be other variations of the invention which are within the scope thereof as defined by the appended claims.

What is claimed is:

1. Apparatus for the carbothermic reduction of a metal oxide to produce a metal carbide utilizing solar energy comprising:
   (a) at least one reflective surface for collecting, reflecting and focusing collected solar radiation;
   (b) a focal mirror in spaced relation to said reflective surface having a reflective face facing the reflective surface for receiving focused and reflected solar radiation from the reflective surface and for focusing such solar radiation received;
   (c) a reaction chamber in spaced relation to said focal mirror for receiving focused solar radiation from said focal mirror;
   (d) a transparent window on said reaction chamber through which the focused solar radiation can pass into the reaction chamber;
   (e) a target area within said reaction chamber toward which the solar energy rays from the focal mirror are focused, said target area located beyond the focal point of the focused energy rays and positioned at a point where the rays diverge;
   (f) means within the reaction chamber for delivering a homogeneous mixture of metal oxide and carbon to the target area;
   (g) a Fresnel lens positioned in front of said transparent window of said reaction chamber along the focal pathway of solar radiation reflected from said focal mirror, for further focusing and concentrating the solar radiation, the Fresnel lens being isolated by the transparent window from the reaction taking place in the reaction chamber;

(h) means for providing a cooling fluid flow between the transparent window and the Fresnel lens; and (i) means for revolving said transparent window so that a different portion of said transparent window is positioned to transmit focused solar radiation to the reaction chamber.

2. Apparatus for the carbothermic reduction of a metal oxide to produce a metal carbide utilizing solar energy comprising:

(a) at least one reflective surface for collecting, reflecting and focusing collected solar radiation;

(b) a focal mirror in spaced relation to said reflective surface having a reflective face facing the reflective surface for receiving focused and reflected solar radiation from the reflective surface and for focusing such solar radaiation received;

(c) a reaction chamber in spaced relation to said focal mirror for receiving focused solar radiation from said focal mirror;

(d) a transparent window on said reaction chamber having a surface facing outward thereof and through which the focused solar radiation can pass into the reaction chamber;

(e) a target area within said reaction chamber toward which the solar energy rays from the focal mirror are focused, said target area located beyond the focal point of the focused energy rays and positioned at a point where the rays diverge;

(f) means within the reaction chamber for delivering a homogeneous mixture of metal oxide and carbon to the target area;

(g) a Fresnel lens positioned in front of said transparent window of said reaction chamber along the focal pathway of solar radiation reflected from said focal mirror, for further focusing and concentrating the solar radiation;

(h) means for providing a cooling fluid flow directed to the surface of the transparent window facing outward of the reaction chamber and to the inside surface of said Fresnel lens;

(i) seal means between the spaced apart Fresnel lens and transparent window, providing a fluid flow passage communicating with the means for providing said cooling fluid flow;

(j) means forming an aperture in the center of said Fresnel lens communicating with said fluid flow passage, said cooling fluid exiting through said apertures; and (k) means for revolving said transparent window so that a different portion of said transparent window is positioned to transmit focused solar radiation to the reaction chamber.

3. Apapratus as defined in claim 2, further comprising a first conical reflector inside having a reflective surface and positioned between said Fresnel lens and said focal mirror for diverting light rays not in focus from said mirror towards the target area, and a second conical reflector within the reaction chamber and having an inside reflecting surface and diverting solar radiation passing through said Fresnel lens and said transparent window to the target area.

4. Apparatus as defined in claim 3, including a refractory reflective hemisphere in said reaction chamber having an inner reflective surface facing and closely adjacent said target area, for diverting solar radiation to the target area, a throat disposed centrally in said reflective hemisphere and opening toward the target area, said second conical reflector connected to said throat and diverging in the direction toward said transparent window of said reaction chamber, for directing solar radiation in a converging pathway from said Fresnel lens and said transparent window to said throat and into said reflective hemisphere.

5. Apparatus as defined in claim 2, said means for providing a cooling fluid flow comprising a plurality of air jets positioned between said transparent window and said Fresnel lens, and also cooling said Fresnel lens.

6. Apparatus for the carbothermic reduction of a metal oxide to produce a metal carbide utilizing solar energy comprising:

(a) at least one reflective surface for collecting, reflecting and focusing collected solar radiation;

(b) a focal mirror in spaced relation to said reflective surface having a reflective face facing the reflective surface for receiving focused and reflected solar radiation from the reflective surface and for focusing such solar radiation received;

(c) a reaction chamber in spaced relation to said focal mirror for receiving focused solar radiation from said focal mirror;

(d) a transparent window on said reaction chamber through which the focused solar radiation can pass into the reaction chamber;

(e) a target area within said reaction chamber toward which the solar energy rays from the focal mirror are focused and then directed on the target area by divergence of the solar rays beyond the focal point thereof;

(f) means within the reaction chamber for delivering a homogeneous mixture of metal oxide and carbon to the target area; and (g) means for revolving said transparent window so that a different portion of said transparent window is positioned to transmit focused solar radiation to the reaction chamber.

7. Apparatus as defined in claim 6, wherein the transparent window comprises a transparent material selected from the group consisting of Pyrex, quartz, sapphire and Vycor.

8. Apparatus as defined in claim 6, further comprising means for cleaning the surface of the transparent window facing the target interiorly of the reaction chamber.

9. Apparatus as defined in claim 6, wherein the means for delivering a homogenous mixture of metal oxide and carbon to the target area comprises a push rod and a plurality of discs of said homogenous mixture, said discs having slots for passage of reaction gas therethrough.

10. Apparatus as defined in claim 6, including means for providing a cooling fluid flow directed to the inside surface of the transparent window.

* * * * *